United States Patent
Iverson

(10) Patent No.: US 6,375,051 B1
(45) Date of Patent: Apr. 23, 2002

(54) CAULK STORAGE AND DISPENSING SYSTEM WITH A REUSABLE CLOSURE DEVICE

(76) Inventor: Richard A. Iverson, 2790 Greenfield, Lisle, IL (US) 60532

(*) Notice: Subject to any disclaimer, the term of this patent is extended or adjusted under 35 U.S.C. 154(b) by 0 days.

(21) Appl. No.: 09/690,300

(22) Filed: Oct. 16, 2000

(51) Int. Cl.⁷ .............................................. B65D 47/00
(52) U.S. Cl. ..................... 222/552; 222/327; 222/563
(58) Field of Search ................................ 222/149, 546, 222/552, 563, 327

(56) References Cited

U.S. PATENT DOCUMENTS

| | | | |
|---|---|---|---|
| 1,740,287 A | * 12/1929 | Davis | 222/552 X |
| 2,035,004 A | * 3/1936 | Van Ness | 222/552 X |
| 2,432,288 A | * 12/1947 | Danziger | 222/552 X |
| 2,849,739 A | 9/1958 | Dresden | |
| 2,969,887 A | * 1/1961 | Darmstadt et al. | 222/563 |
| 2,996,225 A | * 8/1961 | Pike | 222/552 X |
| 4,213,546 A | 7/1980 | Massey | |
| 5,154,327 A | 10/1992 | Long | |
| 5,295,601 A | 3/1994 | Bostelman | |
| 5,379,927 A | 1/1995 | Montenieri et al. | |
| 5,799,829 A | 9/1998 | Lier et al. | |
| 5,894,596 A | 4/1999 | Keith | |
| 6,223,957 B1 | * 5/2001 | Hoppe | 222/563 |

* cited by examiner

*Primary Examiner*—Kenneth Bomberg
(74) *Attorney, Agent, or Firm*—Brinks Hofer Gilson & Lione

(57) ABSTRACT

The invention provides a caulk storage and dispensing system having a reusable sealing device and a caulk dispensing container. The reusable sealing device has a threaded portion disposed on a pin section. The threaded portion seals the caulk dispensing container and assists in removing the reusable sealing device from the caulk dispensing container. The threaded portion may be tapered or straight and may have a constant or variable pitch. The caulk dispensing container has a nozzle surrounding a container opening for dispensing caulk. The reusable sealing device is inserted into the nozzle. The threaded portion may engage the caulk dispensing container and the nozzle interior. A head section may seal the nozzle opening. The reusable sealing device also forms a seal with the caulk. The caulk dries or hardens around the threaded portion, thus sealing the caulk dispensing container and forming a screw hole. The reusable sealing device may be "unscrewed" from the dry or hardened caulk, leaving a channel for caulk to pass.

12 Claims, 7 Drawing Sheets

CAULK STORAGE AND DISPENSING SYSTEM WITH A REUSABLE CLOSURE DEVICE

FIELD OF THE INVENTION

This invention generally relates to systems for storing and dispensing caulk. More particularly, this invention relates to systems for storing and dispensing caulk having caps, adaptors, and other closing devices.

BACKGROUND OF THE INVENTION

Caulk is a pliable material of various compositions. Caulk typically has a paste-like consistency prior to exposure to air and cures or dries when exposed to air. These properties make caulk well suited for sealing cracks, filling joints, joining materials, and similar applications. Caulk is used in bathroom fixtures, kitchen fixtures, window casings, doorframes, gutters, downspouts, fireplaces, stoves, foundations, roofs, and the like. Caulk may be an adhesive, a sealant, cement, and similar materials including silicone, siliconized acrylic, and acrylic latex.

Caulk usually is stored and dispensed from a caulk dispensing container such as a rigid tube, a flexible tube, a flexible bottle, or the like. Generally, the caulk dispensing container has a nozzle surrounding an opening. The nozzle usually is tapered with the larger end adjacent to the opening. The smaller end may be closed. A membrane covers the opening.

In use, the nozzle typically is cut at an angle and at a diameter suitable for applying the caulk. For example, the diameter may match the size of a crack to be sealed or a joint to be filled. A pin, nail, or similar device is inserted through the nozzle to puncture the membrane. The nozzle is positioned adjacent to the crack or joint. Pressure is applied to the caulk dispensing container, thus dispensing material through the nozzle. The nozzle is moved to fill the crack or joint with caulk.

The method of applying pressure depends upon the type of caulk dispensing container. Flexible tubes and bottles typically are made from an elastic or otherwise resilient material. The flexible tube and flexible bottle collapse as pressure is applied to dispense caulk through the nozzle. To maximize the amount of caulk retrieved, the flexible tube may be made from a material that retains its deformed shape when pressure is applied. With such material, the flexible tube may be rolled or folded from the bottom toward the nozzle. A rolling or guide pin may be used to assist rolling the tube.

In contrast, a rigid tube or cartridge generally has a slideable bottom and is used with a "caulking gun" or similar mechanical device. In a typical design, the rigid tube fits into a half-cylindrical shaped portion of the caulking gun. The nozzle extends through a hole or slot in a brace plate. A faceplate engages the slideable bottom. The faceplate is smaller than the inside diameter of the rigid tube. The faceplate attaches to a rod, which connects to a trigger or similar lever device. When the trigger is pressed, the rod presses the faceplate against slideable bottom. The brace plate stops the nozzle end of the rigid tube, forcing the slideable bottom to move toward the nozzle. In this manner, caulk is dispensed through the nozzle. In addition, the rod may have a locking mechanism to hold the faceplate against the slideable bottom even when the trigger is not pressed.

When a caulking project is completed, any remaining caulk may be kept for later use. However, the caulk is exposed to air because the membrane is now broken. Unless the caulk dispensing container is resealed, the caulk in the nozzle and caulk dispensing container may dry and harden. The dry caulk blocks the extraction of caulk from the caulk dispensing container.

Caps, which may be nozzle adaptors and the like, have been developed to reseal the nozzle. In some designs, the cap fits around the outside of the nozzle. These caps may have threads or ridges on the cap interior to engage the nozzle exterior. Many caps are tapered to more completely engage the outside surface of the nozzle. Other caps fit perpendicularly against the nozzle tip.

Cap designs usually are not effective in preventing caulk from drying in the caulk dispensing container and nozzle. The cap may not provide an adequate seal initially or after the caulk is used. The cap may not fit properly on a nozzle. Debris, dry caulk, and other matter may obstruct the connection and may make it difficult to remove the cap. The cap may not adapt well to a cut nozzle, especially an angle cut. A nozzle may be cut in various places. The cap may too small for a cut nozzle or may sit awkwardly once the nozzle is cut. The cap may unseat or detach more easily once the nozzle is cut. Also, dry caulk may attach to the cap, making it difficult to remove the cap from the nozzle.

Some designs have a pin extending from a cap into the nozzle. When the cap is removed from the nozzle, the pin is to provide an open channel for caulk to pass. However, the caulk may dry around the pin, making removal very difficult or nearly impossible. In some designs, the pin does not reach the opening or extend into the caulk dispensing container. The caulk between the pin and the opening may dry, thus preventing the extraction of caulk. Some pins engage the interior surface of the nozzle, which may not be possible once the nozzle is cut.

Accordingly, there is a need for a closure device to prevent caulk from drying in a caulk storage and dispensing system and to reopen the caulk storage and dispensing system when blocked by dry caulk.

SUMMARY

This invention provides a caulk storage and dispensing system having a reusable sealing device and a caulk dispensing container. The reusable sealing device may have a threaded portion disposed on a pin or core section. The threaded portion seals the caulk dispensing container and assists in removing the reusable sealing device from the caulk dispensing container. The caulk may have various compositions and may be an adhesive, a sealant, cement, and other materials suitable for caulk-like uses and applications.

The threaded portion may have one or more threads and may be tapered, straight, or have a combination of straight and tapered portions. The threads may be configured depending upon the caulk material and depending upon the shape and other characteristics of the caulk dispensing container. The thread pitch may be constant and may vary along the length of the threaded portion.

The caulk dispensing container may be any suitable apparatus for storing caulk. In one aspect, the caulk dispensing container has an opening for dispensing caulk. The caulk dispensing container may have a nozzle connected to surround the caulk dispensing container opening. A membrane may cover the caulk dispensing container opening. A nail, pin, or similar object may be inserted into the nozzle to pierce the membrane or the caulk dispensing container.

The reusable sealing device may be inserted into the nozzle. The reusable sealing device may pass through the nozzle. The threaded portion may extend partially or completely into the caulk dispensing container opening and may extend into the caulk dispensing container.

The reusable sealing device may provide single or multiple seals of the caulk dispensing container and the nozzle. The threaded portion may engage one or both of the membrane and the caulk dispensing container to seal the caulk dispensing container opening. The threaded portion also may engage one or both of the nozzle interior and tip to seal the nozzle opening. Similarly, the threaded portion may engage the caulk dispensing container and the nozzle at the same time, to seal the caulk dispensing container and nozzle. Additionally, the head section may engage the tip of the nozzle to seal the nozzle opening. The reusable sealing device may seal one or multiple locations initially and then seal another location or other locations later.

The reusable sealing device also may form a seal with the caulk in the nozzle or the caulk dispensing container opening. The caulk may dry or harden around the threaded portion, sealing the caulk dispensing container and forming a screw hole. The reusable sealing device may be "unscrewed" from the dry or hardened caulk, leaving a channel for caulk to pass.

Other systems, methods, feature, and advantages of the invention will be or will become apparent to one skilled in the art upon examination of the following section figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale; the emphasis placed upon illustrating the principles of the invention. Moreover, like reference numerals in the figures designate corresponding parts throughout the different views.

DETAILED DESCRIPTION OF THE PREFERRED EMBODIMENTS

Figure 1:
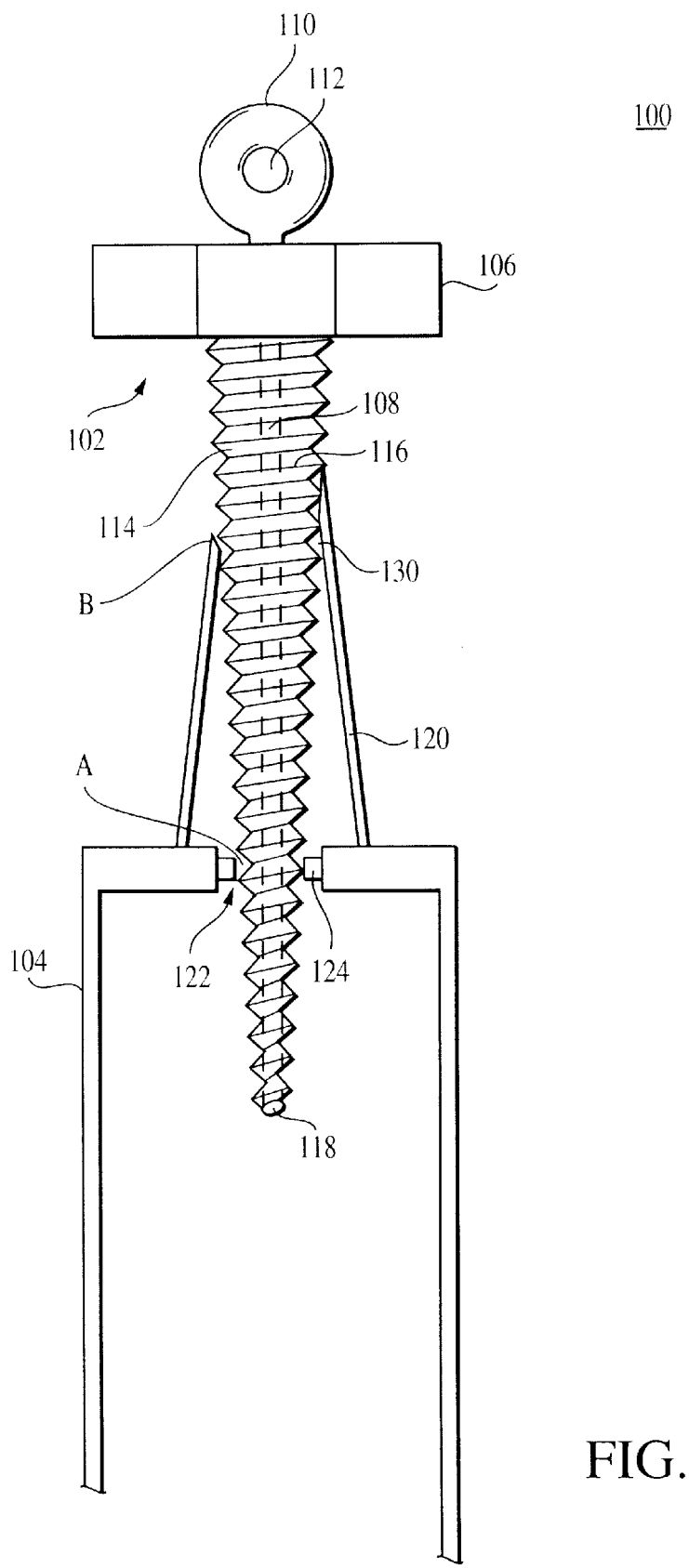
FIG. 1 is a side view of a caulk storage and dispensing system with a reusable sealing device according to a first embodiment.

FIG. 1 shows a caulk storage and dispensing system 100 according to a first embodiment. The caulk storage and dispensing system 100 comprises a reusable sealing device 102 and a caulk dispensing container 104. The caulk used in the caulk storage and dispensing system 100 may be an adhesive, a sealant, cement, and other materials suitable for caulk-like uses and applications. The caulk may have various compositions including silicone, siliconized acrylic, and acrylic latex.

The reusable sealing device 102 and the caulk dispensing container 104 each may be used once and each may be reused. The materials for the reusable sealing device 102 and the caulk dispensing container 104 may be selected depending upon the expected number of reuses. Relatively inexpensive materials may be selected for disposal after one use. More durable materials may be selected for disposal after multiple uses. Additionally, the reusable sealing device 102 may be used on the same caulk dispensing container, similar caulk dispensing containers, and caulk dispensing containers of various sizes.

Figure 2:
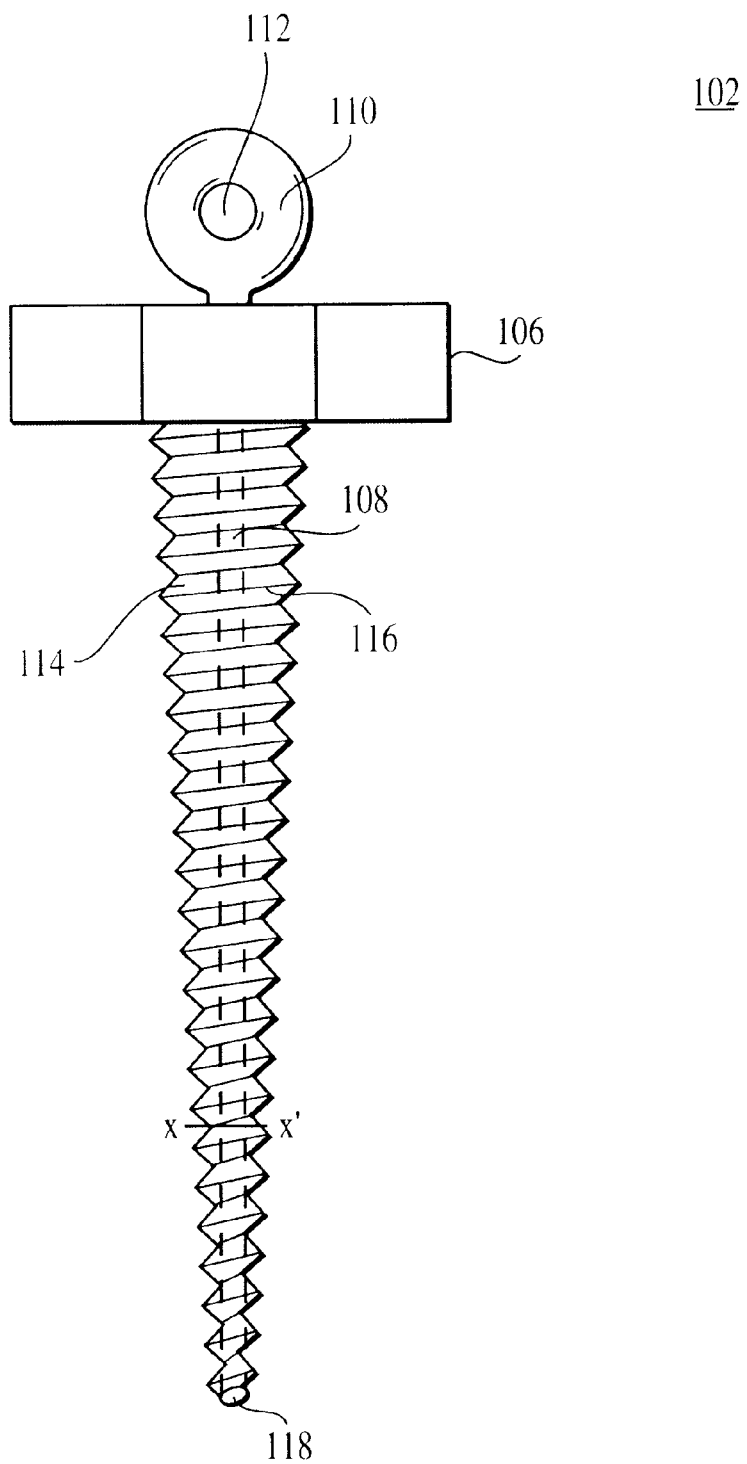
FIG. 2 is a side view of a reusable sealing device for a caulk storage and dispensing system according to the first embodiment.

FIG. 2 shows the reusable sealing device 102, which includes a head section 106, a pin or core section 108, and a threaded portion 114. The head section 106 may have the same material and may comprise the same piece as the pin section 108 and the threaded portion, individually or in combination. The head section 106 may be made of metal, plastic, composite, a combination or combinations, or other suitable material. The head section 106 may have a cap or similar configuration and may be configured to assist hand-turning of the reusable sealing device 102. The head section 106 may also be configured to connect with a tool (not shown) to assist turning the reusable sealing device 102. The head section 106 may have an eyelet 110. The eyelet 110 may form a hole 112, which may receive a cord, a hook, post, or similar apparatus (not shown) to connect the reusable sealing device 102 to a caulking gun, a storage cabinet, and the like (not shown).

In one aspect, the threaded portion 114 is mounted on the surface of the pin section or core 108. The threaded portion 114, may cover the entire surface of the pin section 108. The threaded portion 114 and the pin section 108 may be the same piece and may be made from the same material.

The threaded portion 114 may have one or more threads 116 running clockwise or counter clockwise around the pin section 108. Multiple threads 116 may run parallel or cross each other. The threaded portion 114 may have a pitch in the range of about 0.03 inches (about 0.7 mm) through about 0.25 inches (about 6.4 mm). In one aspect, the pitch gradually narrows from about 0.25 inches (about 6.4 mm) near the head section 106 to about 0.03 inches (about 0.7 mm) at the end of the pin section 108 opposite the head section 106. The pitch may be selected to correspond to the caulk material. A larger pitch may be used with an adhesive.

In one aspect, a cross section X–X' of the pin section 108 and the threaded portion 114 has a surface shape corresponding to the configuration of the caulk dispensing container 104. The surface shape of the cross section X–X' may be circular, oval, other shapes, and a combination. The diameter or area of the cross section X–X' may remain the same or may vary along the length of the pin section 108 and the threaded portion 114. The pin section 108 may have an essentially constant cross-sectional area, while the threaded portion 114 may have a variable cross sectional area. The pin section 108 may be slender, comprising a small amount of the cross section X–X'. The pin section 108 may be stout, comprising most of the cross-section X–X'. The pin section 108 may vary between slender and stout. The pin section 108 may be solid and may be an enclosed hollow. The area or diameter of the cross section X–X' may vary continuously, smoothly, in steps, or by other variations.

In one aspect, the pin section 108 and threaded portion 114 form a tip 118 that is essentially flat or blunt. The tip 118 may form other shapes such as a point and the like. In one aspect, the threaded portion 114 is tapered. The threaded section 114 may be straight, may have one or more tapered sections, and may have one or more straight sections. Additionally, the threaded portion 114 may be configured for a particular caulk dispensing container size, multiple caulk dispensing container sizes, and variable caulk dispensing container sizes. The pin section 108 may comprise metal, plastic, composite, a combination or combinations, or other suitable material.

The threaded portion 114 may be made from the same piece as the pin section 108 or may be a separate piece configured to slide onto or otherwise mount onto the pin section 108. The threaded portion 114 may comprise metal, plastic, composite, a combination or combinations, or other suitable material. In one aspect, the pin section 108 comprises chrome-plated steel and the threaded portion 114 comprises plastic. In one aspect, the threaded portion 114 comprises a non-stick material such as polytetrafluroethylene.

Figure 3:
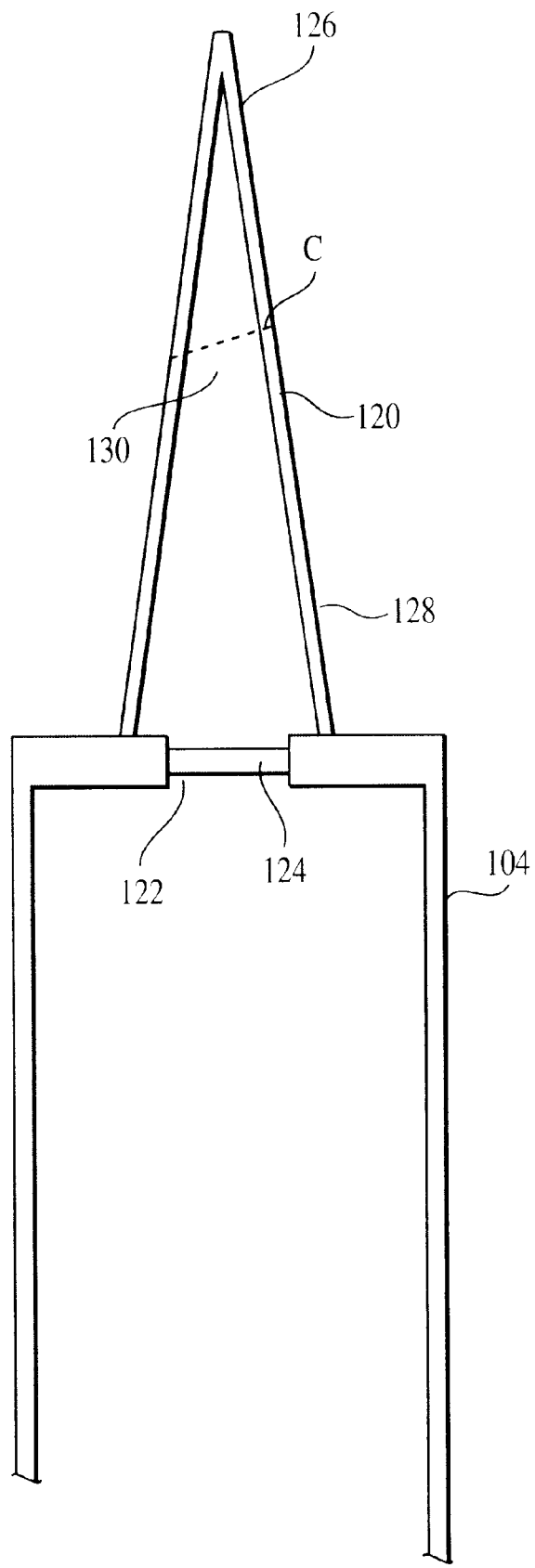
FIG. 3 is a caulk caulk dispensing container for a caulk storage and dispensing system according to the first embodiment.

FIG. 3 shows the caulk dispensing container 104, which may be a rigid tube, a flexible tube, a flexible bottle, or any other suitable apparatus for storing and dispensing caulk. The bottom portion of the caulk dispensing container 104 is not shown. The caulk dispensing container 104 has a caulk dispensing container opening 122 for dispensing caulk. The caulk dispensing container opening 122 may be preformed, partially or completely, and may be formed by the reusable sealing device 102.

The caulk dispensing container may be made of metal, plastic, composite, paper or cardboard, a combination or combinations, and any other suitable material to store and dispense caulk. If a rigid tube, the caulk dispensing container 104 may be configured for use in a caulking gun or other device for dispensing caulk. The caulk dispensing container may have a slideable bottom (not shown). If a flexible tube, the caulk dispensing container 104 may comprise a deformable material such as aluminum or an aluminum alloy. The caulk dispensing container 104 may include a rolling pin or guide (not shown) to assist rolling or folding the caulk dispensing container 104 as caulk is dispensed.

The caulk dispensing container 104 may have a nozzle 120—a tube-like structure extending from the caulk dispensing container 104—or another caulk dispensing apparatus. The nozzle 120 may be part of the caulk dispensing container 104 or a separate component. In one aspect, the nozzle 120 is tapered, having a variable diameter. The nozzle 120 may be straight, having a constant diameter. In one aspect, the nozzle 120 has a tip 126 and a base 128. The base 128 may be connected to surround the caulk dispensing container opening 122 formed in the caulk dispensing container 104. The tip 126 forms a nozzle opening 130, which may be opened or closed initially.

A membrane 124 may cover the caulk dispensing container opening 122. In one aspect, the membrane 124 is thinner than the wall thickness of the caulk dispensing container 104. The membrane 124 may have the same or larger diameter than the caulk dispensing container opening 122. The membrane 124 may be disposed on either side or along the wall inside the caulk dispensing container opening 122. In one aspect, the membrane 124 is made from a thin film comprising aluminum, a plastic, or other suitable material. The membrane 124 also may be formed by dried caulk in the caulk dispensing container opening 122.

In another aspect, the caulk dispensing container opening 122 may be a pilot hole (not shown) for the pin section 108 to penetrate. The threaded portion 114 may be configured like a self-tapping screw to assist penetration, with or without the pilot hole in the caulk dispensing container 104. The pilot hole may have a membrane from a material or from dried caulk as previously discussed.

Referring to FIGS. 1–3, the nozzle 120 may be cut to form the nozzle opening 130 having an appropriate diameter and angle along line C. The nozzle may be cut anywhere and at different angles along the length of the nozzle 120. In one aspect, the angle is about 45°. The nozzle 120 may be cut flat or essentially parallel to the caulk dispensing container 104. The nozzle opening 130 may be preformed in the nozzle 120, so no cutting may be necessary. A nail, pin, or similar object (not shown) may be inserted into the nozzle 120 to pierce the membrane 124 or the caulk dispensing container 104. Caulk may then flow out of the caulk dispensing container 104 and through the nozzle 120.

In one aspect, the reusable sealing device 102 is inserted—screwed or otherwise disposed—into the nozzle opening 130. The reusable sealing device 102 may extend into or pass through the nozzle 120. The threaded portion 108 may extend partially or completely into the caulk dispensing container opening 122 and may extend into the caulk dispensing container 104. Additionally, the tip 118 of the reusable sealing device 102 may be used to pierce the membrane 124 or the caulk dispensing container 104 rather than the nail, pin, or similar object as previously described.

The reusable sealing device 102 may provide single or multiple seals of the caulk dispensing container 104 and the nozzle 120. A seal or sealing includes partially or completely stopping air from reaching the caulk. The reusable sealing device 102 may be disposed to seal the caulk dispensing container opening 122. The threaded portion 114 may engage one or both of the membrane 122 and the caulk dispensing container 104 at area A or a similar area. The reusable sealing device 102 may be disposed to seal the nozzle opening 130. The threaded portion 114 may engage the interior of the nozzle 120 in area B or a similar area. The threaded portion 114 also may engage the tip 126. Area B may be anywhere along the interior at the tip of the nozzle 120. Area B may be the same as the area adjacent to line C.

The reusable sealing device 102 may seal both the caulk dispensing container opening 122 and the nozzle opening 130. The reusable sealing device 102 may be disposed in the nozzle 120 and in the caulk dispensing container opening 122. As previously discussed, the threaded portion 114 may engage one or both of the membrane 122 and the caulk dispensing container 104 at area A or a similar area. The threaded portion 114 also may engage the interior and tip of the nozzle 120 in area B or a similar area at the same time.

In addition, the head section 106 may engage the tip 126 of the nozzle 120 to seal the nozzle opening 130. The tip 126 and the head section 106 may be configured to form a better seal when connected. The head section 106 may be configured to match the tip 126. A washer, gasket, or other sealing interface (not shown) may be disposed between the head section 106 and the tip 126.

In one aspect, the reusable sealing device 102 seals one or multiple locations initially and then seals another location or other locations later. The threaded portion 114 initially may seal the nozzle opening 130. When the tip 126 is cut, the threaded portion 114 may seal the nozzle opening 130 and the caulk dispensing container opening 122. When the tip 126 is cut again, the head section 106 may seal the tip 126 and the threaded portion 114 may seal the caulk dispensing container opening 122.

In another aspect, the reusable sealing device 102 forms a seal with the caulk in one or both of the nozzle 120 and the caulk dispensing container opening 122. The caulk in the nozzle 120 and the caulk dispensing container opening 130 may dry or harden around the threaded portion 114, thus sealing the caulk dispensing container opening 122 and the nozzle opening 130.

The threaded portion 114 also may assist removal of the reusable sealing device 102 from the caulk dispensing container 104 and the nozzle 120. The dry or hardened caulk forms a screw hole (not shown) having caulk threads (not shown) patterned by the threads 116. The reusable sealing device 102 may be "unscrewed" from the dry or hardened caulk, leaving a channel for caulk to pass. The threaded portion 114 may be configured depending upon the caulk material and depending upon the shape and other characteristics of the nozzle 120, the caulk dispensing container opening 122, the nozzle opening 130, and other aspects of the caulk dispensing container 104.

FIGS. 4–8 show alternate embodiments. In these figures, like reference numerals designate corresponding parts to the first embodiment described in FIGS. 1–3. The corresponding parts have similar functions and may be interchanged amongst the embodiments.

Figure 4:
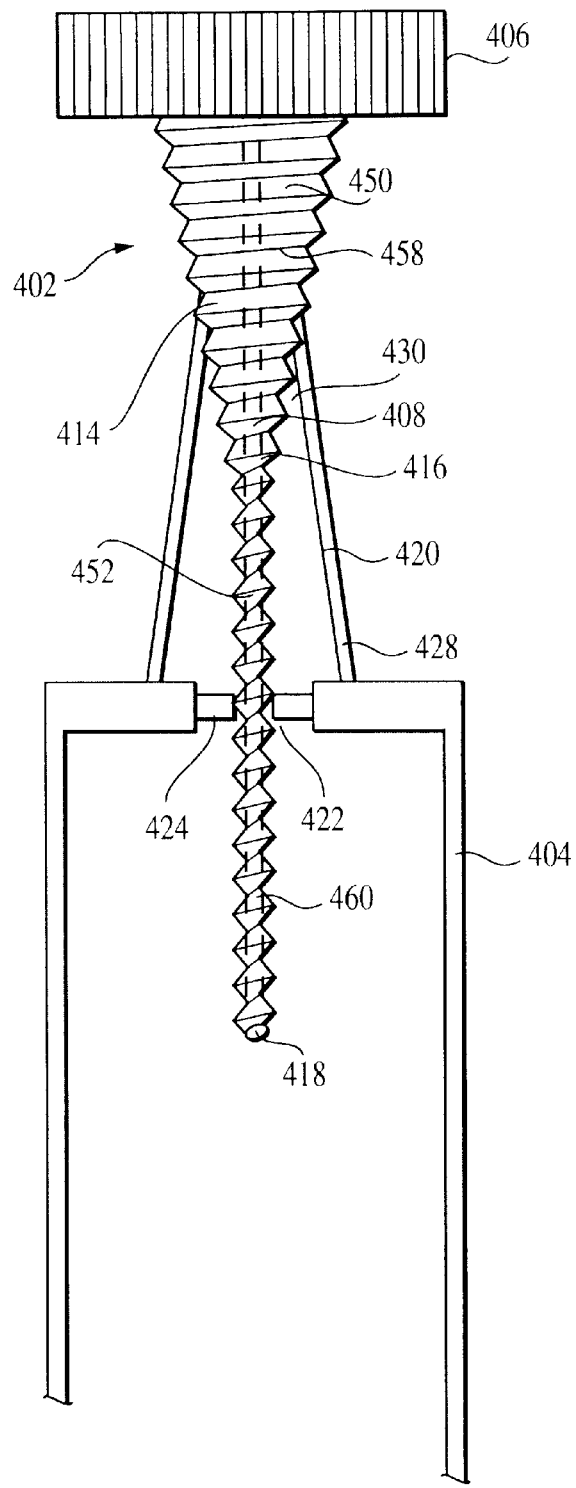
FIG. 4 is a side view of a caulk storage and dispensing system with a reusable sealing device according to a second embodiment.

FIG. 4 shows a caulk storage and dispensing system 400 according to a second embodiment. In one aspect, a threaded portion 414 has a tapered segment 450 and a straight section 452. The tapered segment 450 may be located closer to a head section 406 and may comprise a sleeve slid over a pin section 408. There may be multiple tapered segments and multiple straight portions, which may be interspersed.

A thread 416 may pass through both the tapered segment 450 and the straight segment 452. Alternatively, the thread 416 may comprise a tapered thread portion 458 and a straight thread portion 460 passing through the tapered segment 450 and the straight segment 452. The tapered segment 450 and the straight segment 452 may have the same, different, or variable pitches. In one embodiment, the tapered segment 450 has a pitch of about 0.25 inches (about 6.4 mm) and the straight segment 452 has a pitch of about 0.03 inches (about 0.7 mm).

Figure 5:
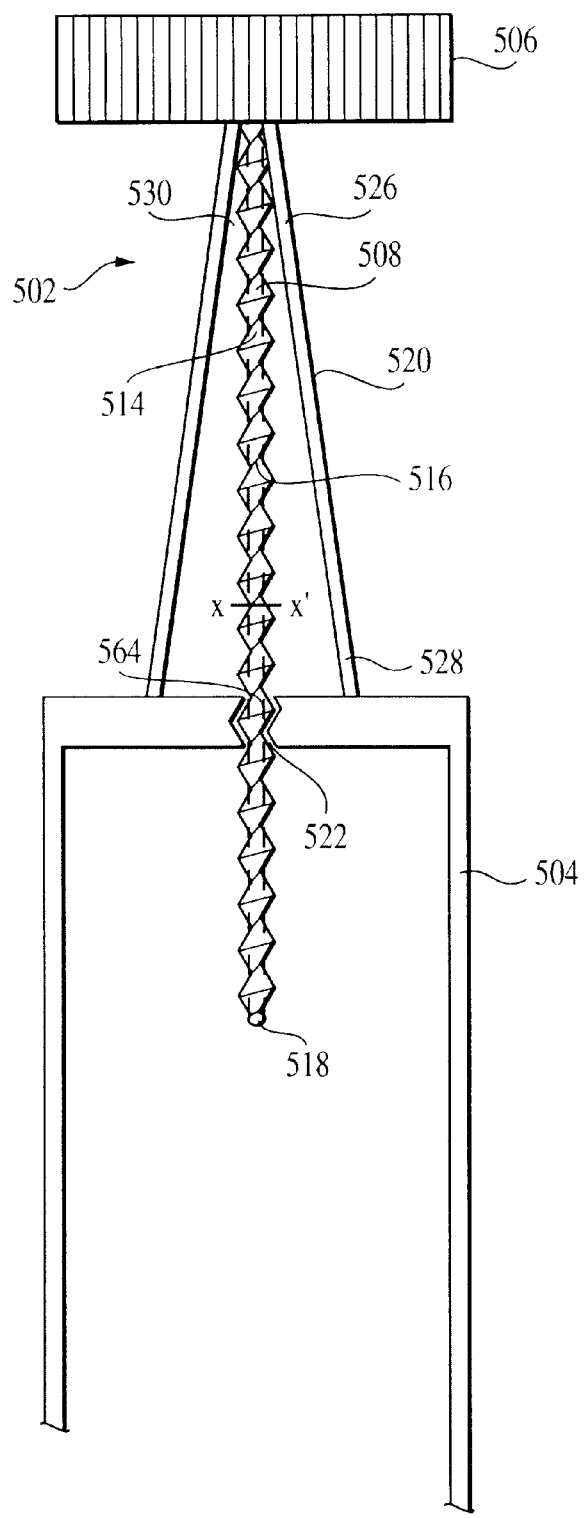
FIG. 5 is a side view of a caulk storage and dispensing system with a reusable sealing evicted according to a third embodiment.

FIG. 5 shows a caulk storage and dispensing system 500 according to a third embodiment. In one aspect, a cross section X–X' of a pin section 508 and threaded portion 514 is configured to correspond to a caulk dispensing container opening 522. The cross section X–X' may remain essentially the same; in which case, the caulk dispensing container opening 522 may have a cylindrical shape. The cross section X–X' may vary to form a tapered surface; in which case, the caulk dispensing container opening 522 may be inversely tapered or have a V-shape. The caulk dispensing container opening 522 may be pre-formed in a caulk dispensing container 504 to have a diameter corresponding to the outside diameter of the pin section 508 and threaded portion 514. In one embodiment, the pin section 508 and threaded portion 514 form the caulk dispensing container opening 522 when inserted or screwed into the caulk dispensing container 504. The threaded portion 514 may have a self-tapping configuration. The caulk dispensing container opening 522 may be a pin hole (not shown) to assist screwing the pin section 508 and threaded portion 514 into the caulk dispensing container 504.

In another aspect, the caulk dispensing container 504 may have receiving threads 564 along the circumference of the caulk dispensing container opening 522. The receiving threads 564 correspond to the threads 516 on the threaded portion 514. A caulk dispensing container 504 may be manufactured with a reusable sealing device 502 already inserted into the caulk dispensing container opening 522. To use, the reusable sealing device 502 may be unscrewed from the caulk dispensing container opening 522. A nozzle 520 may be precut to the desired diameter and angle. The caulk dispensing container 504 may have a pilot hole (not shown) to assist inserting or screwing the tip 518 to form the caulk dispensing container opening 522.

Figure 6:
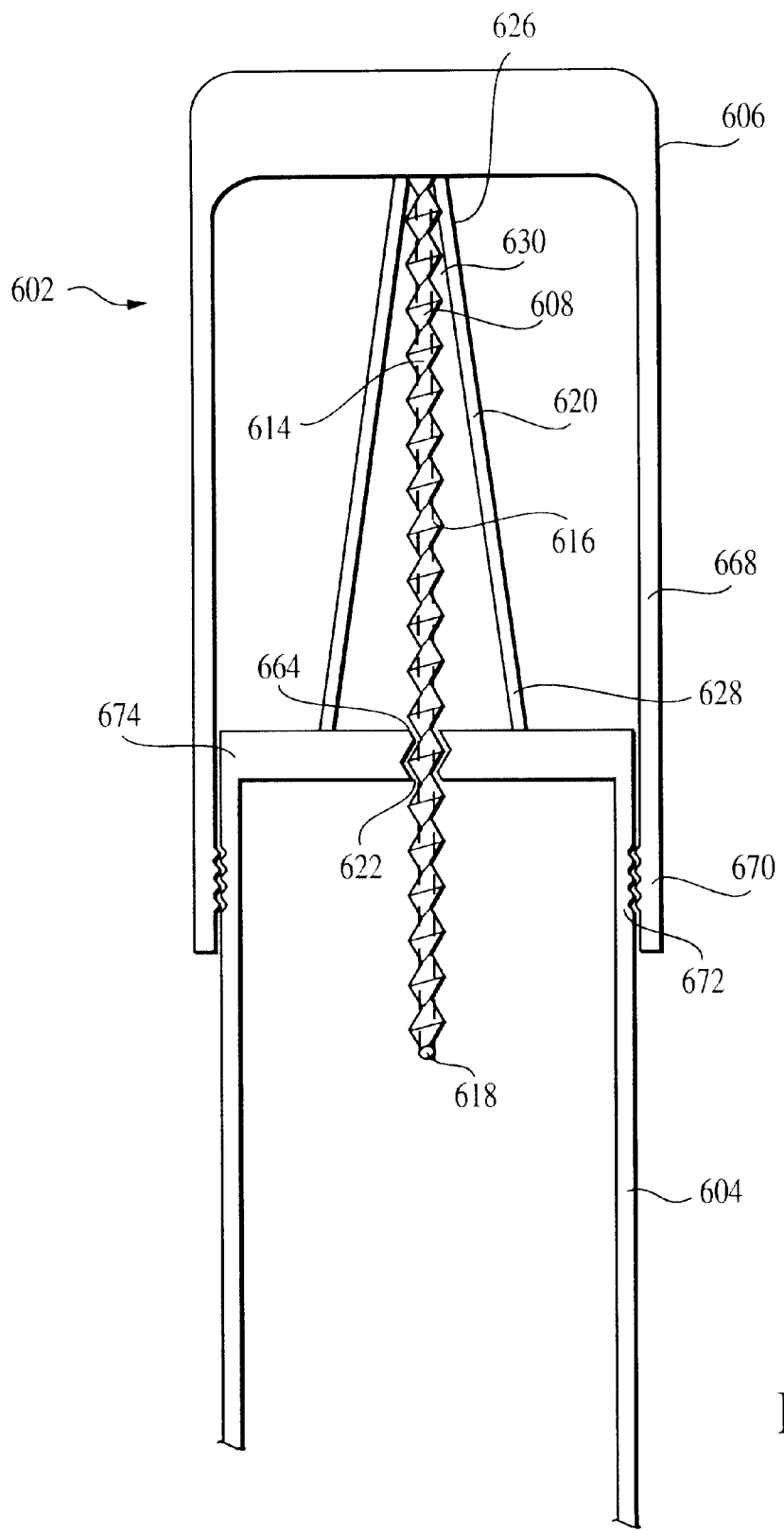
FIG. 6 is a side view of a caulk storage and dispensing system with a reusable sealing device according to a fourth embodiment.

FIG. 6 shows a caulk storage and dispensing system 500 according to a fourth embodiment. A head section 606 has a cap extension 668 surrounding a nozzle 620 and engaging a side portion 674 of a caulk dispensing container 604. The cap extension 668 may have a shape or cross-sectional area corresponding to the caulk dispensing container 604.

In one aspect, the cap extension 668 is formed of an elastic or flexible material that flexes to permit the cap extension 668 to slide over the side portion 674 of the caulk dispensing container 604. The cap extension 668 may have a slightly smaller diameter or cross section than the caulk dispensing container 604. The cap extension 668 may have cap threads or rings 670 on an interior surface. The cap threads 670 may engage the side portion 674. The cap threads 670 may operatively engage side threads 672 on the side portion 674.

The cap extension 668 may be installed when the caulk storage and dispensing system 600 is manufactured. The cap extension 668 also may guide a pin section 608 and threaded portion 614 into the caulk dispensing container opening 622. When the cap extension 668 is aligned with the side portion 674, the pin section 608 and threaded portion 614 may be aligned with the caulk dispensing container opening 622. The cap extension 668 may seal the nozzle 620 and caulk dispensing container 604. The cap extension 668 also may protect the nozzle 620 and caulk dispensing container 604 from damage when not in use.

Figure 7:
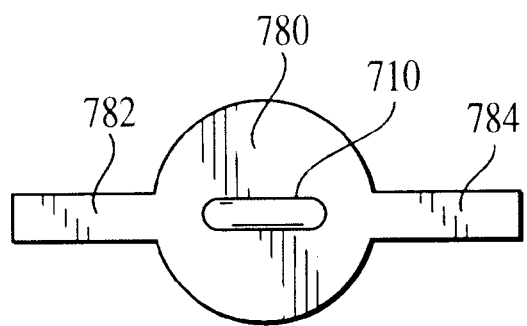
FIG. 7 is a top view of a head section for a reusable sealing device.

FIG. 7 shows a top view of a head section 706. In one aspect, the head section 706 is a wing section-shaped cap having a center area 780, a first wing section 782, and a second wing section 784. The first and second wing sections 782 and 784 may be oppositely connected to the center area 780. Additional wing sections (not shown) may be connected to the center area 780. An eyelet 710 may be connected to the center area 780.

Figure 8:
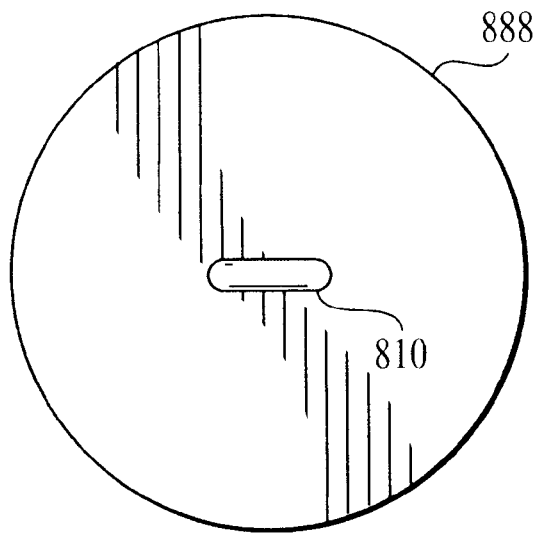
FIG. 8 is a top view of an alternate head section for a reusable sealing device.

FIG. 8 shows the top view of a head section 806. The head section 806 may be configured as a circular cap having a larger diameter than a pin section 808 (not visible in this view). The head section 806 may be configured in other shapes such as a square, rectangle, triangle, and the like. The head section 806 may have vertical ridges 888 (not visible in this view) along a circumference to assist hand-turning. An eyelet 810 may be connected to the circular cap 888.

Various embodiments of the invention have been described and illustrated. However, the description and illustrations are by way of example only. Many more embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A reusable sealing device for a caulk storage dispensing system having a container with a nozzle, the container forming a container opening, the nozzle having a base and a tip, the base connected to surround the container opening, the tip forming a nozzle opening, comprising:

a threaded portion on a surface of a pin section, where the threaded portion comprises a tapered segment connected to a straight section, the tapered segment to engage an interior surface of the nozzle, the straight section to engage the container opening; and a head section connected to the pin section, the head section defining an eyelet.

2. A reusable sealing device according to claim 1, where the threaded portion comprise a non-stick material.

3. A reusable sealing device according to claim 1, where the threaded portion has multiple threads.

4. A reusable sealing device according to claim 1, where the tapered segment and the straight section have the same pitch.

5. A reusable sealing device according to claim 1, where the threaded portion has multiple pitches.

6. A reusable sealing device according to claim 1, where the threaded portion has a variable pitch.

7. A reusable sealing device according to claim 1, where the threaded portion comprises at least one pitch in the range of about 0.03 inches (about 0.8 mm) through about 0.25 inches (about 6.4 mm).

8. A reusable sealing device according to claim 1, where the head section comprises a cap.

9. A reusable sealing device according to claim 8, where the cap further comprises a plurality of wing sections connected to a center area.

10. A reusable sealing device according to claim 9, where the plurality of wing sections further comprise a first wing section and a second wing section, where the first and second wing sections are oppositely connected to the center area.

11. A reusable sealing device according to claim 1, where the straight section is configured to engage a membrane in the container opening.

12. A reusable seating device according to claim 1, where the straight section is configured to engage a caulk material in at least one of the container opening and the base of the nozzle.

* * * * *